(12) United States Patent
Lin

(10) Patent No.: US 7,353,731 B2
(45) Date of Patent: Apr. 8, 2008

(54) QUICK RELEASE HANDLEBAR STEM ASSEMBLY FOR A BICYCLE

(76) Inventor: Ah-Ping Lin, No. 4-5, Shu Pai Li, Chang Hwa City (TW) 50080

( * ) Notice: Subject to any disclaimer, the term of this patent is extended or adjusted under 35 U.S.C. 154(b) by 464 days.

(21) Appl. No.: 11/053,036

(22) Filed: Feb. 8, 2005

(65) Prior Publication Data

US 2006/0179969 A1 Aug. 17, 2006

(51) Int. Cl.
*B62K 21/16* (2006.01)
(52) U.S. Cl. .................................... 74/551.7
(58) Field of Classification Search .... 74/551.1–551.8; 403/92, 93, 96, 97, 322.1, 322.4; 280/279, 280/280
See application file for complete search history.

(56) References Cited

U.S. PATENT DOCUMENTS

| 3,304,107 A * | 2/1967 | Bahmuller .................. 403/93 |
| 5,540,465 A * | 7/1996 | Sisk ........................... 285/365 |
| 6,058,800 A * | 5/2000 | Giard ......................... 74/551.1 |
| 6,234,042 B1 * | 5/2001 | An ............................. 74/551.5 |
| 6,827,518 B2 * | 12/2004 | Hon ............................. 403/93 |
| 6,948,878 B1 * | 9/2005 | Smith et al. ................. 403/110 |
| 6,964,425 B2 * | 11/2005 | Turner ........................ 280/276 |
| 2006/0099027 A1 * | 5/2006 | Liao ......................... 403/322.4 |
| 2007/0186716 A1 * | 8/2007 | Chen .......................... 74/551.3 |

* cited by examiner

*Primary Examiner*—Vicky A. Johnson
(74) *Attorney, Agent, or Firm*—Charles E. Baxley

(57) ABSTRACT

A quick release handlebar stem assembly for a bicycle comprises a stem having a first pivotal connecting portion, a clamping portion formed on the stem, and a clamping member is pivotally connected to the clamping portion, the clamping member is provided with a retained portion; a quick-release locking clamp pivotally coupled the first pivotal connecting portion of the stem; a retainer pivotally coupled to the quick-release locking clamp is provided with a retaining portion for locking the retained portion of the clamping member; wherein the retainer can hook the clamping member when rotating the quick-release locking clamp, so that the clamping member will cooperate with the clamping portion to clamp and release a handlebar of a bicycle.

10 Claims, 7 Drawing Sheets

QUICK RELEASE HANDLEBAR STEM ASSEMBLY FOR A BICYCLE

BACKGROUND OF THE INVENTION

1. Field of the Invention

The present invention relates to a handlebar stem assembly for a bicycle, and more particularly to a quick release handlebar stem assembly which permits quick removal of the handlebar of a bicycle.

2. Description of the Prior Arts

A conventional handlebar stem assembly is usually disposed above the front fork of a bicycle for fixing the handlebar, normally at the front of the vertical pipe is provided a clamping bush, at the lower side of the clamp is defined a slot, and on the sidewall of the slot is formed a threaded hole for insertion of a screw. The handlebar is received in the clamping bush and is clamped firmly therein by tightening the screw. However, the handlebar stem assembly is not easy to be assembled or removed since it is fixed by means of screws, and accordingly the mounting angle of the handlebar is difficult to be adjusted.

Therefore, a handlebar stem assembly having quick-release feature as shown in FIG. 1 was developed to overcome the above-mentioned defects, which includes an adjustable stem 11 fixed to the vertical pipe 10, at the front end of the adjustable stem 11 is formed a hollow-structured clamping portion 12. A slot 13 is formed at a predetermined position of the clamping portion 12, and a through threaded hole 14 is formed in the slot 13 and arranged in the axial direction thereof for insertion of a screw 15. The front end of the screw 15 extends to the front of the clamping portion 12 and is locked with a quick-lock clamp 16 which is formed at an end with a cam structure 17, and thus the clamping portion 12 can be opened and closed arbitrarily by turning the quick-lock clamp 16, so as to clamp or loosen the handlebar 18. Although the mounting angle can be adjusted by loosening the handlebar 18, the clamping portion 12 still cannot be fully opened to get the handlebar 18 removed directly, and the handlebar 18 only can be axially pulled out of the clamping portion 12 after removal of the gripping portion and the brake system, and this is really troublesome.

The present invention has arisen to mitigate and/or obviate the afore-described disadvantages.

SUMMARY OF THE INVENTION

The primary objective of the present invention is to provide a quick release handlebar stem assembly which permits quick removal of the handlebar of a bicycle, wherein the handlebar can be quick released without requiring to remove other components (such as the gripping portion on the handlebar and brake assembly).

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
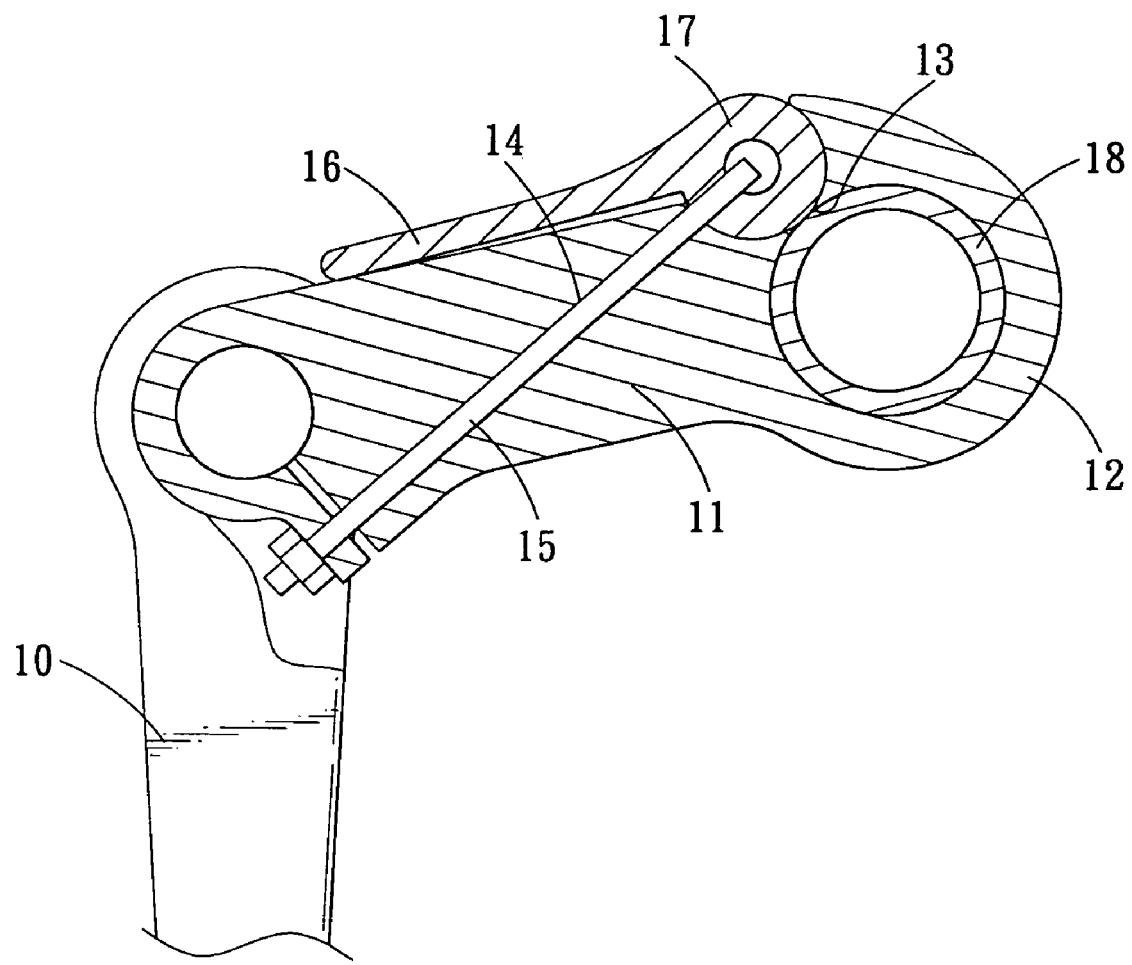
FIG. 1 is a conventional quick release handlebar stem assembly for a bicycle.
Figure 2:
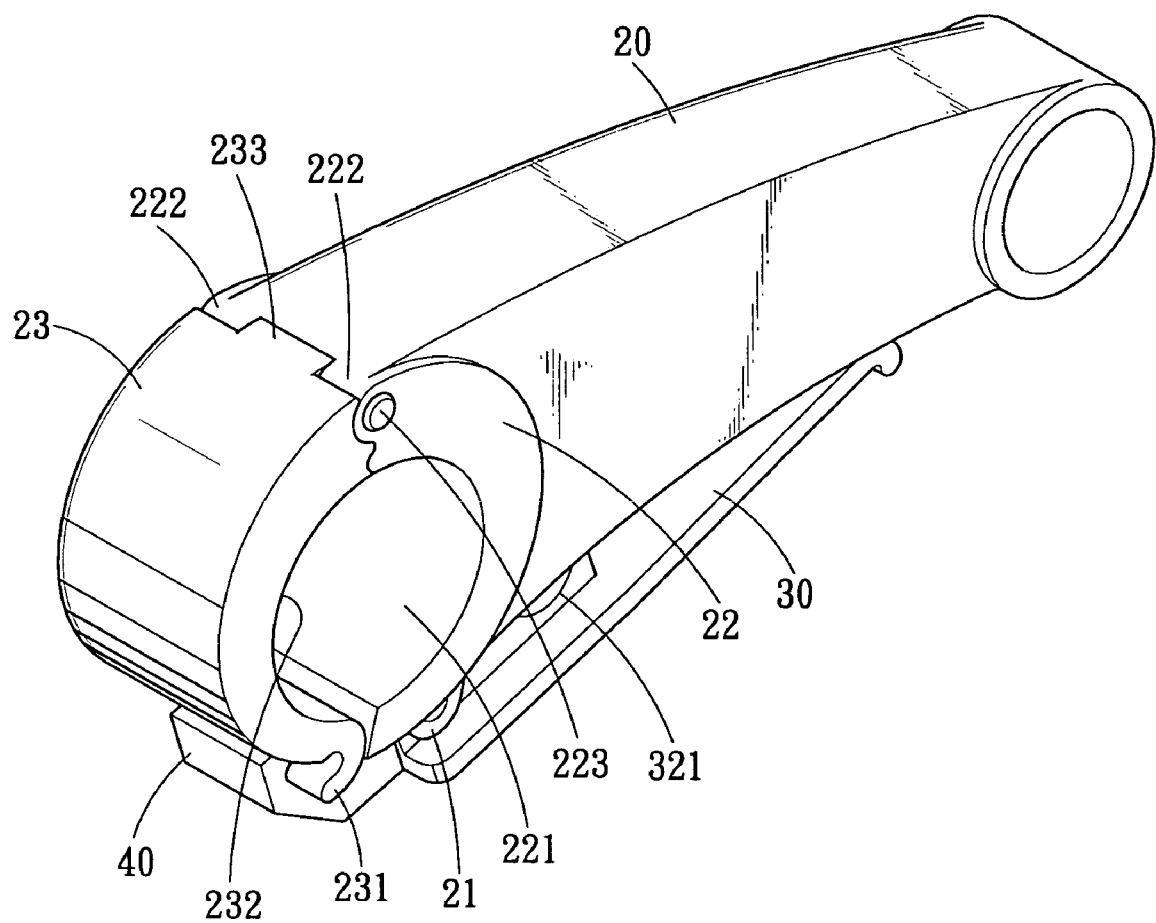
FIG. 2 is an assembly view of a quick release handlebar stem assembly for a bicycle in accordance with a first preferred embodiment of the present invention.
Figure 3:
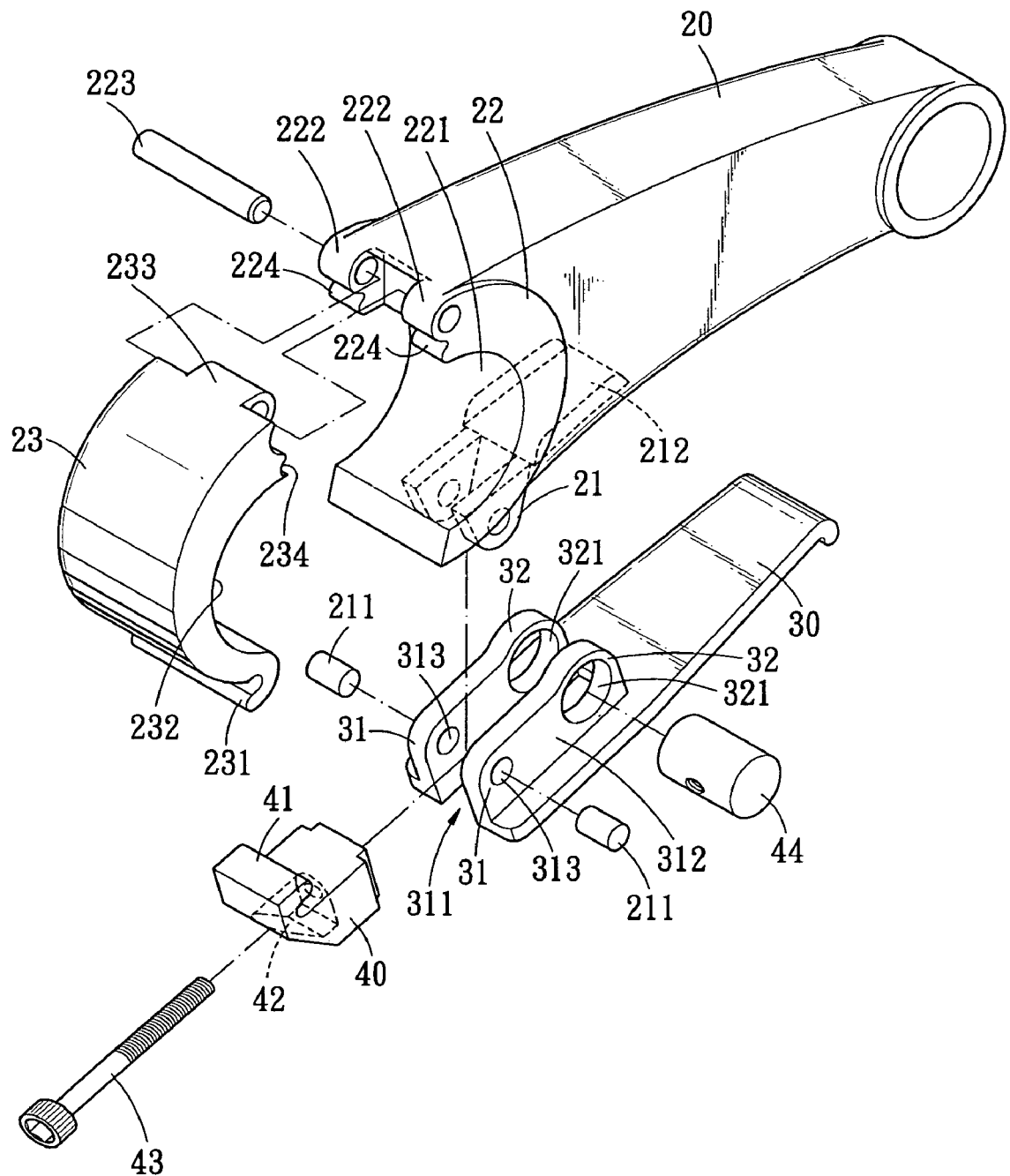
FIG. 3 is an exploded view of a quick release handlebar stem assembly for a bicycle in accordance with the first preferred embodiment of the present invention.
Figure 4:
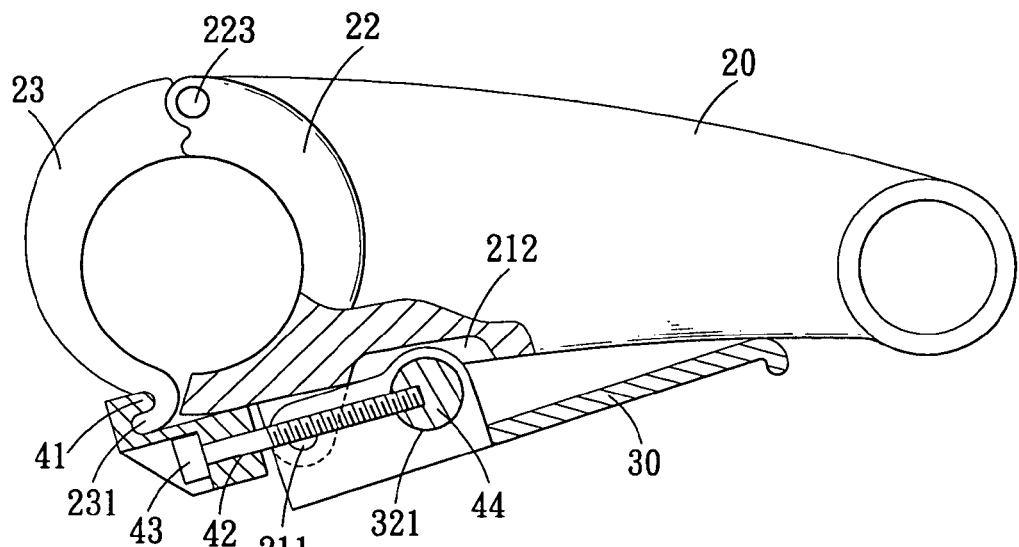
FIG. 4 is a side view of a quick release handlebar stem assembly for a bicycle in accordance with the first preferred embodiment of the present invention.

Referring to FIGS. 2-4, a quick release handlebar stem assembly for a bicycle in accordance with a preferred embodiment of the present invention is shown and comprises: a stem 20, a quick-release locking clamp 30 and a retainer 40.

Figure 7:
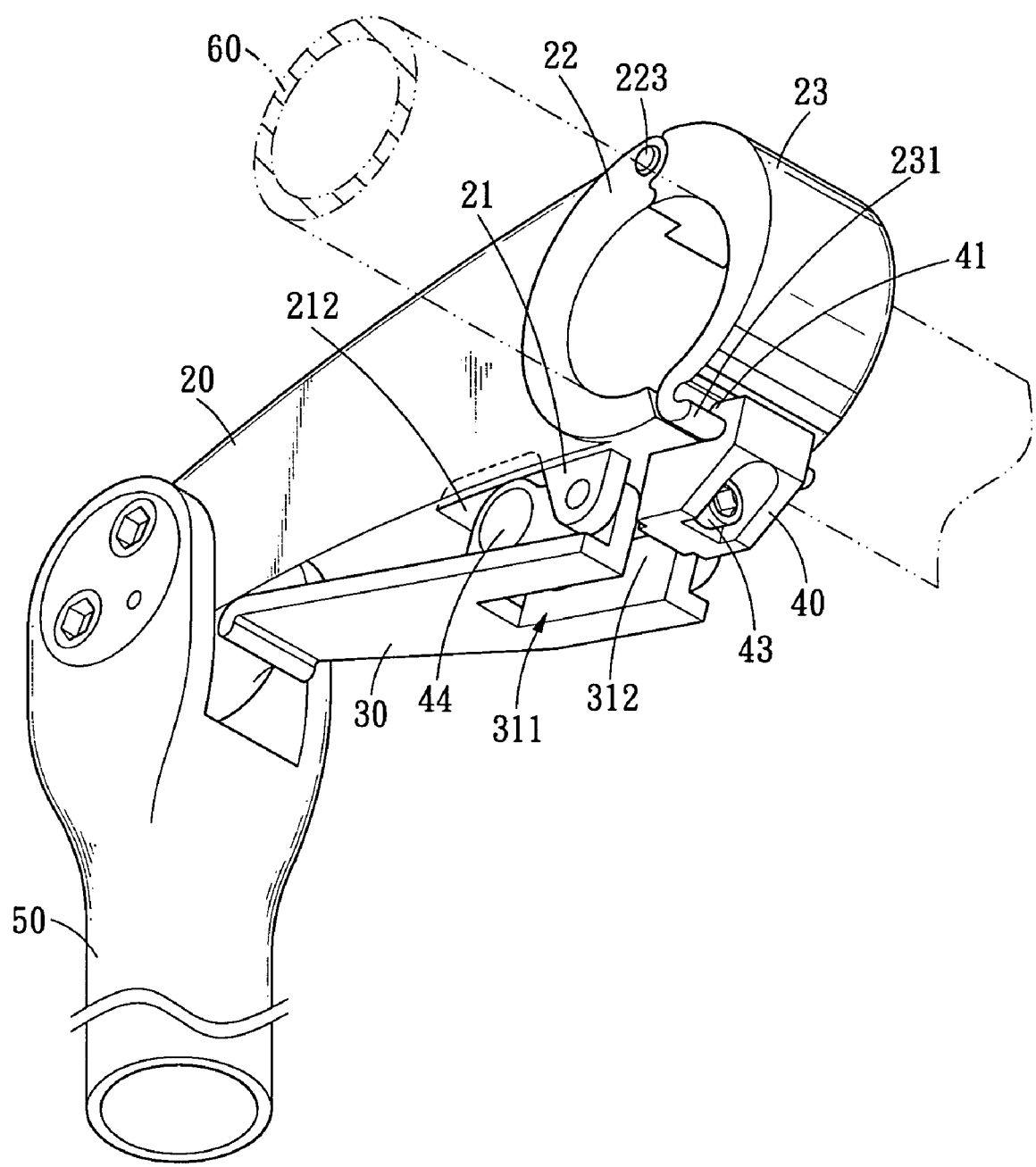
FIG. 7 is another operational view of a quick release handlebar stem assembly for a bicycle in accordance with the first preferred embodiment of the present invention.

The stem 20 having a rear end coupled to the top end of a vertical pipe 50 of a bicycle is used to clamp a handlebar 60 (as shown in FIG. 7), at a lower side of the stem 20 is provided a first pivotal connecting portion 21, and a clamping portion 22 is formed at a front end of the stem 20. A clamping member 23 is pivotally connected to an upper side of the clamping portion 22 and can be swiveled to a completely open position. The clamping portion 22 cooperates with the clamping member 23 to clamp the handlebar 60. The clamping member 23 is provided at an open-end thereof with a retained portion 231, and the first pivotal connecting portion 21 consists of two opposing ring-shaped ears for insertion of a pivot 211. Between the two opposing ears of the first pivotal connecting portion 21 is formed a groove 212 for accommodation of a part of the quick-release locking clamp 30. The clamping portion 22 has a semi-circular shape and is provided at its front end thereof with an arc surface 221 which is formed correspondingly to the profile of the handlebar 60. The clamping member 23 is a semi-circular plate and is provided at its rear end thereof with an arc surface 232 which is also formed correspondingly to the profile of the handlebar 60, and the retained portion 231 is hook-shaped. At a mid portion of the connecting end of the clamping member 23 is integrally formed a tubular member 233, at either side of the clamping portion 22 is formed a tubular member 222, and a pivot 223 is inserted in the tubular members 233, 222, so that the clamping member 23 is pivotally coupled to the clamping portion 22 and can be swiveled to a fully open and fully close position.

The quick-release locking clamp 30 is an elongated structure pivotally connected to the first pivotal connecting portion 21 of the stem 20 and can be turned arbitrarily. On the inner surface of the quick-release locking clamp 30 is arranged a first pivoting portion 31 for mating with the first pivotal connecting portion 21 of the stem 20. At the rear end of the first pivoting portion 31 is formed a second pivoting portion 32. At the mid portion of the front end of the quick-release locking clamp 30 is formed a slot 311, and two opposing plates 312 are erected at both sides of the slot 311.

The first pivoting portion consists of a pivoting hole 313 formed at the front portion of the respective plates 312 for insertion of the pivot 211 of the first pivotal connecting portion 21 of the stem 21, and the second pivoting portion 32 consists of the pivoting holes 321 formed on the rear portion of the plates 312.

The retainer 40 is rotatably disposed at the second pivoting portion 32 of the quick-release lock clamp 30 and extends to the open end of the clamping member 23. At the front end of the retainer 40 is formed a hook-like retaining portion 41 for locking and unlocking the retained portion 231 of the clamping member 23. The retainer 40 is formed with a through hole 42 for insertion of a fastener 43 (which is a screw for example as shown in the drawings), the fastener 43 extends to the second pivoting portion 32 of the quick-release locking clamp 30 and is screwed with a pivot 44 which is inserted in the pivoting holes 321 of the second pivoting portion 32, so that the retainer 40 is rotatably connected to the quick-release lock clamp 30.

Figure 5:
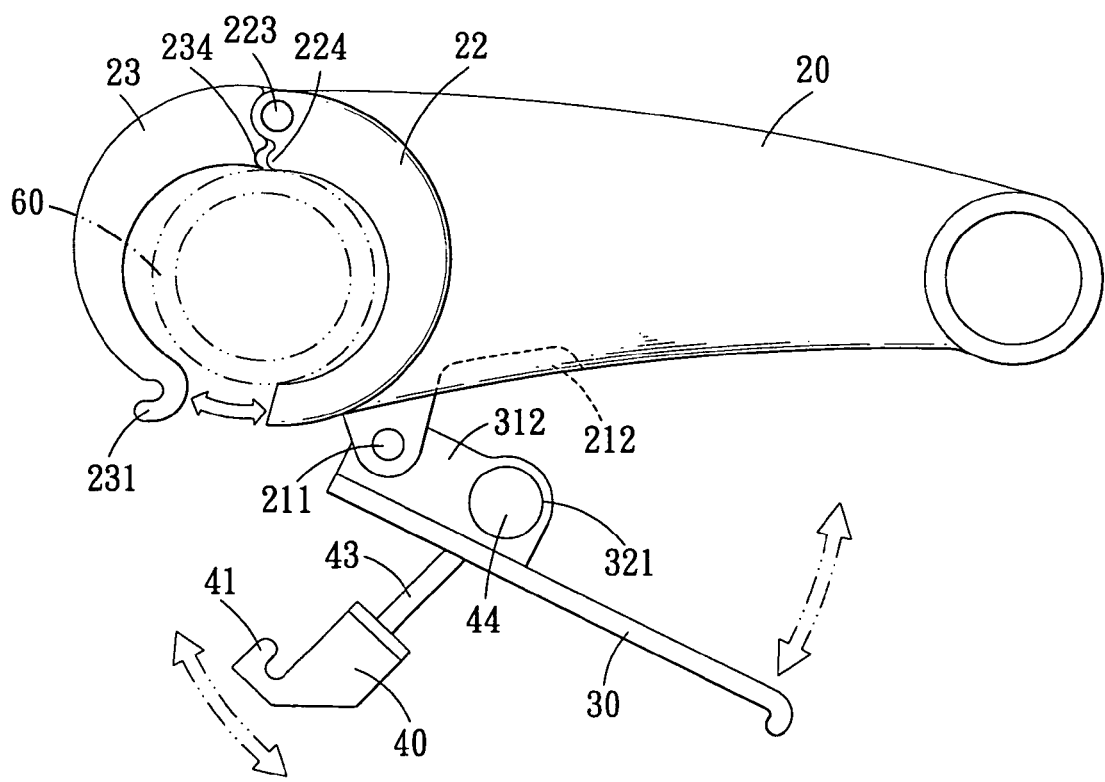
FIG. 5 is an operational view of a quick release handlebar stem assembly for a bicycle in accordance with the first preferred embodiment of the present invention.

For a better understanding of the present invention, its operation and function, references should be made particularly to FIGS. 4 and 5, the quick-release locking clamp 30 can easily enable the retainer 40 to lock or unlock the retained portion 231 of the clamping member 23, so that the handlebar 60 can be clamped between the clamping member 23 and the clamping portion 22. The retained portion 231 of the clamping member 23 can quick released from the clamping portion 22, so as to open the clamping member 23 to a fully open positioning, for easy removal of the handlebar 60 from the handlebar stem assembly.

Figure 6:
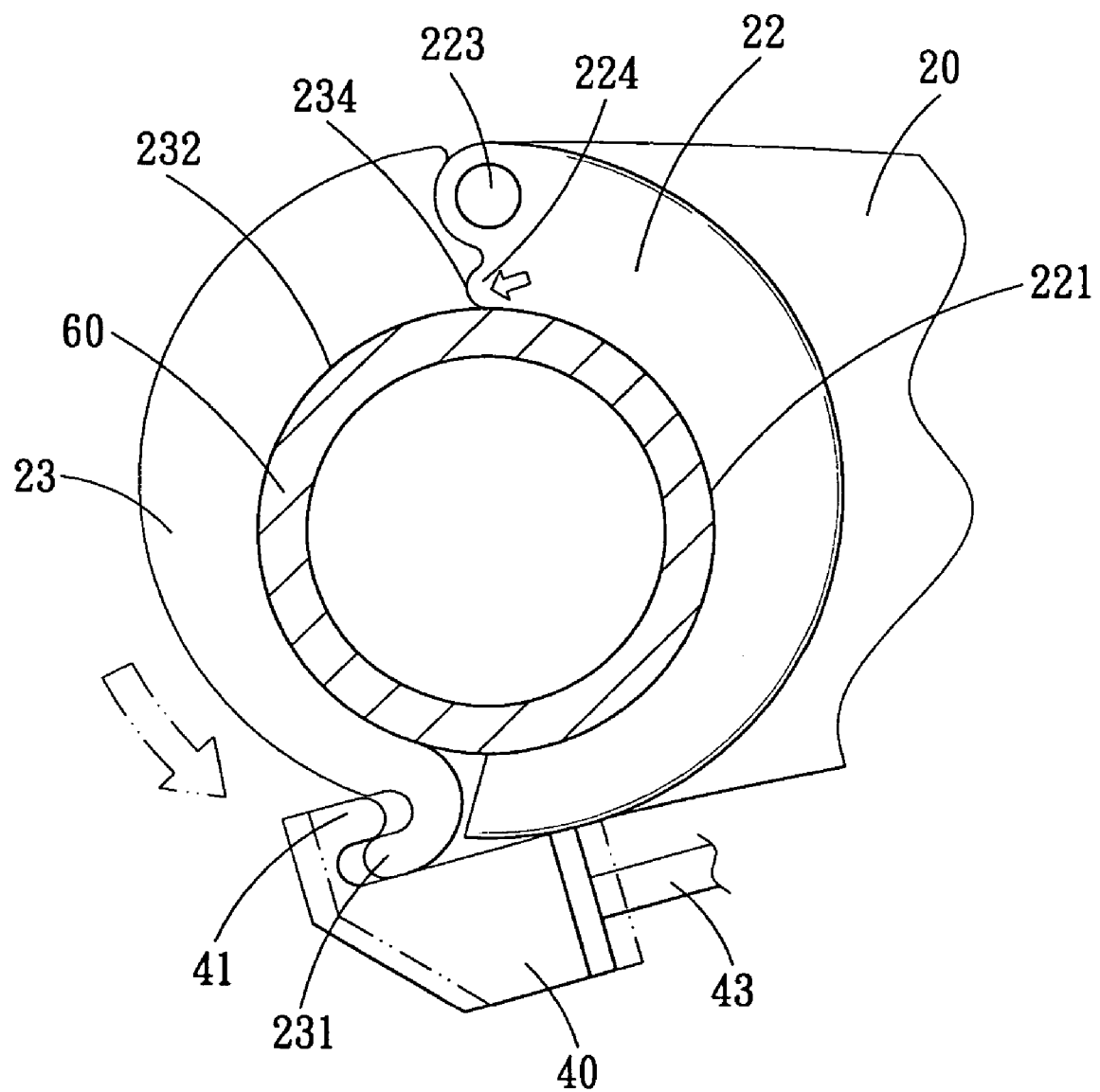
FIG. 6 is another operational view of a quick release handlebar stem assembly for a bicycle in accordance with the first preferred embodiment of the present invention.

Referring next to FIGS. 5-7, the stem 20 is fixed to the vertical pipe 50 of a bicycle, and then the clamping member 23 can be swiveled to a completely open position for permitting the handlebar 60 to be clamped directly between the arc surfaces 221, 232 of the clamping portion 22 and the clamping member 23. After that, the quick-release locking clamp 30 can be turned to move the retainer 40 forward until the retaining portion 41 is hooked with the retained portion 231 of the clamping member 23, and finally just by pulling the quick-release locking clamp 30 backward, the handlebar 60 is tightly clamped in the clamping member 23. And vice versa, the retainer 40 can also be unlocked from the clamping member 23 just by turning the quick-release locking clamp 30, for quick removal of the handlebar 60, so that the handlebar 60 can be quick released without requiring to remove other components (such as the gripping portion on the handlebar and brake assembly).

Referring again to FIGS. 3, 5 and 6, to clamp the handlebar 60 more firmly, an arresting projection 224 can be formed on the clamping portion 22 and located at a position below the tubular members 223 of the stem 20, and the clamping member 23 can be correspondingly provided with two arresting cavities 234 which are located at both sides of the tubular member 233. The user can turn the quick-release locking clamp 30 clockwise to hook the retainer 40 to the clamping member 23, after the retainer 40 is hooked with the clamping member 23, the quick-release locking clamp 30 can be turned counterclockwise to clamp the handlebar 60. Before the quick-release locking clamp 30 reaches the apex of its travel, there are some clearances between the arc surfaces 221, 232 and the handlebar 60 (the handlebar 60 is not hold tightly), and at that moment, the arresting projections 224 rests against the arresting cavities 234 of the clamping member 23. When the quick-release locking clamp 30 reaches the apex of its travel, the clamping member 23 will be pulled further to push the handlebar 60 against the clamping portion 22, meanwhile, the arresting projections 224 will cooperate with the arresting cavities 234 to make the clamping member 23 and the clamping portion 22 elastically clamp the handlebar 60, as shown in FIG. 6, thus the handlebar 60 can be clamped more tightly. Moreover, when the quick-release locking clamp 30 is turned clockwise and moves over the apex of its travel, the pressing force between the arresting projections 224 and the arresting cavities 234 will make the clamping member 23 bounce off the retainer 40 automatically. Therefore, the handlebar 60 can be removed easily.

Figure 8:
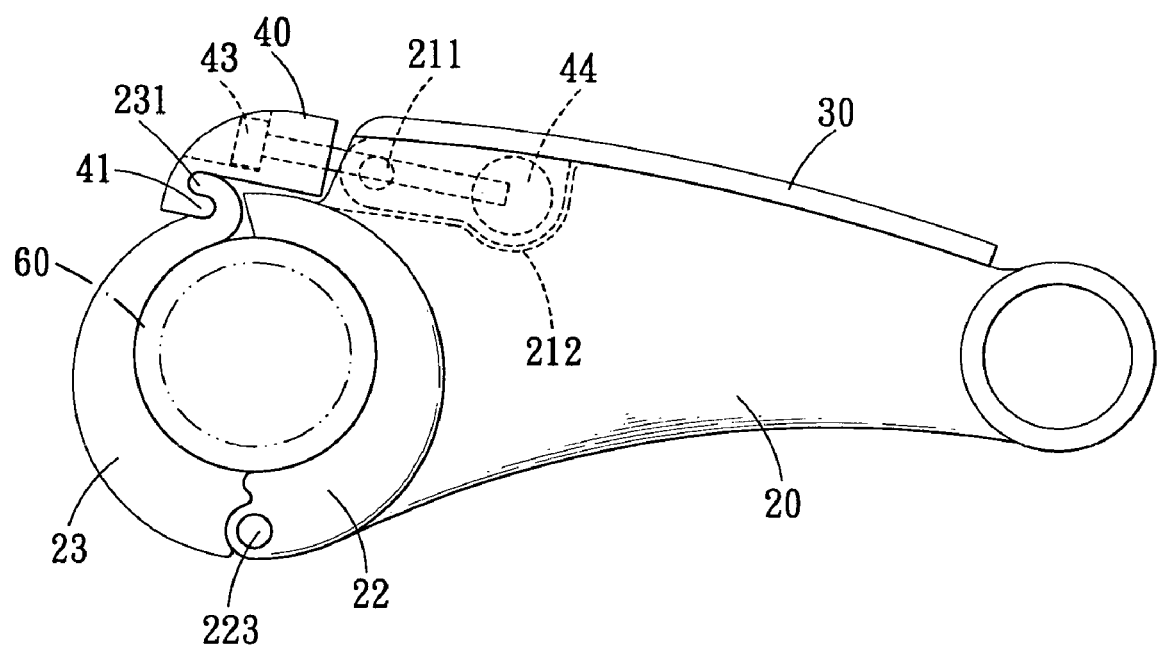
FIG. 8 shows a quick release handlebar stem assembly for a bicycle in accordance with a second preferred embodiment of the present invention.

It will be noted that the quick-release locking clamp 30 and the retainer 40 also can be disposed at the upper side of the stem 20 (as shown in FIG. 8).

While we have shown and described various embodiments in accordance with the present invention, it should be clear to those skilled in the art that further embodiments may be made without departing from the scope of the present invention.

What is claimed is:

1. A quick release handlebar stem assembly for a bicycle comprising:

a stem mounted to a vertical pipe of a bicycle, at a side of the stem being formed a first pivotal connecting portion, a clamping portion formed at the front end of the stem, and a clamping member being pivotally connected to an upper side of the clamping portion, at an open-end of the clamping member being provided with a retained portion;

a quick-release locking clamp pivotally coupled the first pivotal connecting portion of the stem;

a retainer pivotally coupled to the quick-release locking clamp and being extended to the open end of the clamping member, the retainer having a retaining portion for locking the retained portion of the clamping member;

wherein the retainer will be caused to hook the clamping member by rotating the quick-release locking clamp, so that the clamping member will cooperate with the clamping portion to clamp and release a handlebar of a bicycle.

2. The quick release handlebar stem assembly for a bicycle as claimed in claim 1, wherein the first pivotal connecting portion of the stem consists of two opposing ring-shaped ears for insertion of a pivot.

3. The quick release handlebar stem assembly for a bicycle as claimed in claim 2, wherein a groove is formed at a center of the first pivotal connecting portion for accommodation of the quick-release locking clamp.

4. The quick release handlebar stem assembly for a bicycle as claimed in claim 2, wherein a first pivoting portion is formed on inner surface of the quick-release locking clamp for connecting the first pivotal connecting portion of the stem, which consists of a slot formed at mid portion of a front end of the quick-release locking clamp, and two opposing plates erected at both sides of the slot, on a front portion of each of the two opposing plates is a formed a pivoting hole.

5. The quick release handlebar stem assembly for a bicycle as claimed in claim 4, wherein a second pivoting portion is formed at a rear end of the first pivoting portion and consists of pivoting holes formed on a rear portion of each of the two opposing plates.

6. The quick release handlebar stem assembly for a bicycle as claimed in claim 5, wherein the retainer is formed with a through hole for insertion of a fastener, the fastener extends to the second pivoting portion of the quick-release locking clamp and is screwed with a pivot which is inserted in the pivoting holes of the second pivoting portion, so that the retainer is rotatably connected to the quick-release lock clamp.

7. The quick release handlebar stem assembly for a bicycle as claimed in claim 1, wherein the clamping portion of the stem has a semi-circular shape and is provided at its front end thereof with an arc surface which is formed correspondingly to the handlebar, and the clamping member is a semi-circular plate and is provided at its rear end thereof with an arc surface which is also formed correspondingly to the handlebar.

8. The quick release handlebar stem assembly for a bicycle as claimed in claim 1, wherein a tubular member is integrally formed at a mid portion of a connecting end of the clamping member, at either side of the clamping portion is also formed a tubular member, and a pivot is inserted in the respective tubular members.

9. The quick release handlebar stem assembly for a bicycle as claimed in claim 8, wherein an arresting projection is formed on the clamping portion and located at a position below the tubular members of the stem, and the clamping member is correspondingly provided with two arresting cavities which are located at both sides of the tubular member of the clamping member.

10. The quick release handlebar stem assembly for a bicycle as claimed in claim 1, wherein the retained portion of the clamping member is hook-shaped, and the retaining portion of the retainer is also hook-shaped for locking the retained portion of the clamping member.

* * * * *